United States Patent
Kim et al.

(10) Patent No.: US 11,658,285 B2
(45) Date of Patent: May 23, 2023

(54) METHOD FOR MANUFACTURING NEGATIVE ELECTRODE FOR SECONDARY BATTERY AND NEGATIVE ELECTRODE FOR SECONDARY BATTERY

(71) Applicant: LG CHEM, LTD., Seoul (KR)

(72) Inventors: Ju Ri Kim, Daejeon (KR); In Chul Kim, Daejeon (KR); Joo Yong Song, Seongnam-si (KR); Seok Koo Kim, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 288 days.

(21) Appl. No.: 16/376,439

(22) Filed: Apr. 5, 2019

(65) Prior Publication Data
US 2019/0237750 A1    Aug. 1, 2019

Related U.S. Application Data

(63) Continuation of application No. PCT/KR2018/007789, filed on Jul. 10, 2018.

(30) Foreign Application Priority Data

Jul. 31, 2017 (KR) .......................... 10-2017-0096794

(51) Int. Cl.
*H01M 4/1395* (2010.01)
*H01M 4/1391* (2010.01)
(Continued)

(52) U.S. Cl.
CPC ........... *H01M 4/1395* (2013.01); *H01M 4/04* (2013.01); *H01M 4/0404* (2013.01);
(Continued)

(58) Field of Classification Search
CPC .... H01M 4/1395; H01M 4/04; H01M 4/0404; H01M 4/0435; H01M 4/139;
(Continued)

(56) References Cited

U.S. PATENT DOCUMENTS

| 4,502,903 A | 3/1985 | Bruder |
| 4,622,277 A | 11/1986 | Bedder et al. |

(Continued)

FOREIGN PATENT DOCUMENTS

| CN | 102035026 A | 4/2011 |
| CN | 202121011 U | 1/2012 |

(Continued)

OTHER PUBLICATIONS

International Search Report (PCT/ISA/210) issued in PCT/KR2018/007789, dated Nov. 1, 2018.

(Continued)

*Primary Examiner* — Miriam Stagg
*Assistant Examiner* — Rachel L Zhang
(74) *Attorney, Agent, or Firm* — Birch, Stewart, Kolasch & Birch, LLP

(57) ABSTRACT

A method of manufacturing a negative electrode for a secondary battery includes a first step of preparing a lithium metal sheet coated with a lithium metal or to which the lithium metal is adhered in a form of a thin film on a release film and wound into a roll, a second step of laminating the lithium metal sheet to allow the lithium metal to be adjacent to a negative electrode material mixture, to thereby manufacture a negative electrode in which lithium metal is laminated and a third step of applying pressure to the negative electrode. The release film is coated with silicon. The negative electrode manufacturing method uniformly laminates or bonds lithium metal which is difficult to handle on the negative electrode material mixture of the secondary (Continued)

battery and advantageously enhances the speed of the pre-lithiation by using the patterned lithium metal.

10 Claims, 2 Drawing Sheets

(51) Int. Cl.
  *H01M 4/36*    (2006.01)
  *H01M 10/0525*  (2010.01)
  *H01M 4/04*    (2006.01)
  *H01M 10/058*   (2010.01)
  *H01M 4/139*   (2010.01)
  *H01M 4/02*    (2006.01)

(52) U.S. Cl.
  CPC ......... *H01M 4/0435* (2013.01); *H01M 4/139* (2013.01); *H01M 4/1391* (2013.01); *H01M 4/366* (2013.01); *H01M 10/058* (2013.01); *H01M 10/0525* (2013.01); *H01M 2004/027* (2013.01)

(58) Field of Classification Search
  CPC ............... H01M 4/1391; H01M 4/366; H01M 10/0525; H01M 10/058
  See application file for complete search history.

(56) References Cited

U.S. PATENT DOCUMENTS

| | | | |
|---|---|---|---|
| 5,435,054 | A | 7/1995 | Tonder et al. |
| 6,761,744 | B1 | 7/2004 | Tsukamoto et al. |
| 2002/0015894 | A1* | 2/2002 | Wariishi .............. H01M 10/052 429/314 |
| 2005/0008938 | A1 | 1/2005 | Cho et al. |
| 2005/0084760 | A1* | 4/2005 | Hwang ................ H01M 4/667 429/234 |
| 2005/0130043 | A1* | 6/2005 | Gao ..................... H01M 4/043 429/231.95 |
| 2013/0032288 | A1* | 2/2013 | Lien ..................... B32B 37/0046 156/290 |
| 2014/0295265 | A1 | 10/2014 | You et al. |
| 2015/0079485 | A1* | 3/2015 | Choi ....................... B32B 27/08 429/403 |
| 2015/0137029 | A1* | 5/2015 | Ichisaka ................ H01M 4/139 252/182.1 |
| 2017/0200937 | A1 | 7/2017 | Li et al. |
| 2017/0301485 | A1 | 10/2017 | Cao et al. |
| 2017/0324073 | A1* | 11/2017 | Herle .................. H01M 50/403 |

FOREIGN PATENT DOCUMENTS

| | | |
|---|---|---|
| CN | 103199217 A | 7/2013 |
| CN | 104577086 A | 4/2015 |
| CN | 105374571 A | 3/2016 |
| CN | 105489846 A | 4/2016 |
| CN | 106450467 A | 2/2017 |
| JP | 6-140028 A | 5/1994 |
| JP | 10-289708 A | 10/1998 |
| JP | 2007-500922 A | 1/2007 |
| JP | 2013-20974 A | 1/2013 |
| JP | 2015-7283 A | 1/2015 |
| JP | 2016-35921 A | 3/2016 |
| JP | 2016-146232 A | 8/2016 |
| KR | 10-2005-0007484 A | 1/2005 |
| KR | 10-2006-0020904 A | 3/2006 |
| KR | 10-0824048 B1 | 4/2008 |
| KR | 10-1162794 B1 | 7/2012 |
| KR | 10-2016-0106290 A | 9/2016 |
| WO | WO 2017/131997 A1 | 8/2017 |

OTHER PUBLICATIONS

Chinese Office Action for Chinese Application No. 201880003741.1, dated Feb. 8, 2022, with English translation.

Ming et al., "Applications of pre-lithiation technologies in energy storage," Energy Storage Science and Technology, vol. 6, No. 2, Mar. 2017, pp. 223-236 (14 pages total), with English abstract.

* cited by examiner

METHOD FOR MANUFACTURING NEGATIVE ELECTRODE FOR SECONDARY BATTERY AND NEGATIVE ELECTRODE FOR SECONDARY BATTERY

This application is a By-Pass Continuation of International Application No. PCT/2018/007789, filed Jul. 10, 2018, which claims the benefit of priority based on Korean Patent Application No. 10-2017-0096794, filed on Jul. 31, 2017. The contents of these applications are incorporated herein by reference in their entireties.

TECHNICAL FIELD

The present invention relates to a method for manufacturing a negative electrode of a secondary battery having improved pre-lithiation rate of the negative electrode and a negative electrode for a secondary battery manufactured by the method, and more particularly, to a method of manufacturing a negative electrode for a secondary battery having a feature that a silicon-coated release film is applied to improve the releasability with the release film and the lithium metal and a patterned lithium metal is laminated on the negative electrode in order to improve the pre-lithiation rate when manufacturing a negative electrode by laminating lithium metal, which is laminated on a silicon-coated release film, on a negative electrode material mixture, and a secondary battery in which charging is started by injecting an electrolyte into an electrode assembly including the negative electrode.

BACKGROUND ART

As the price of energy sources increases due to depletion of fossil fuels and the interest in environmental pollution increases, the demand for environmentally friendly alternative energy sources becomes an indispensable factor for future life. Especially, as technology development and demand for mobile devices are increasing, demand for secondary batteries as energy sources is rapidly increasing.

Typically, in terms of the shape of the battery, there is a high demand for a prismatic secondary battery and a pouch-type secondary battery that can be applied to products such as mobile phones with a small thickness. In terms of materials, there is a high demand for lithium secondary batteries such as lithium ion batteries and lithium ion polymer batteries having high energy density, discharge voltage, and output stability.

Generally, in order to prepare a secondary battery, first, a positive electrode and a negative electrode are formed by applying an active material to a surface of a current collector, then a separator is interposed therebetween to thereby make an electrode assembly, which is then mounted in a cylindrical or rectangular metal can or inside a pouch-type case of an aluminum laminate sheet, and a liquid electrolyte in injected or impregnated into the electrode assembly or a solid electrolyte to prepare a secondary battery.

In general, the negative electrode of a lithium secondary battery uses a carbon material such as graphite, but the theoretical capacity density of carbon is 372 mAh/g (833 mAh/cm3). Therefore, in order to improve the energy density of the negative electrode, silicon (Si), tin (Sn), oxides and alloys thereof which are alloyed with lithium are considered as negative electrode materials. Among them, silicon-based materials have attracted attention due to their low cost and high capacity (4200 mAh/g).

However, when a carbon material or a negative electrode active material having a theoretical capacity density of more than 833 mAh/cm$^3$ is used for a secondary battery, it is usually difficult to obtain a secondary battery having a large battery capacity because a large irreversible capacity exists.

Herein, the irreversible capacity is a capacity lost in the first charge/discharge cycle. That is, in a charge/discharge reaction of a conventional secondary battery, lithium discharged from a positive electrode is stored in a negative electrode during charging, and lithium discharged from the negative electrode is stored in the positive electrode during discharging. Therefore, when the irreversible capacity at the negative electrode is large at the first charge/discharge, the negative electrode and the positive electrode lose a part of the reversible capacity originally possessed, so that the secondary battery cannot be obtained. Here, in the case of the irreversible capacity of the negative electrode, lithium is partially deactivated due to the side reaction with the electrolyte occurring at the time of charging, but since reversible lithium remains due to the hysteresis of the insertion/discharge potential of the lithium, and thus it is considered as a cause of reduction of an available reversible capacity.

In particular, when the silicon-based negative electrode active material is used, the initial irreversible capacity becomes large. In the case of the silicon negative electrode active material, the volume change and the surface side reaction are so severe that a large amount of lithium inserted into the negative electrode does not return to the positive electrode at the time of initial charging, and thus the initial irreversible capacity becomes large. When the initial irreversible capacity increases, there occurs a problem that the battery capacity and the cycle are rapidly reduced.

Thus, in order to reduce the deterioration of the battery capacity due to the irreversible capacity of the negative electrode, a technology for replenishing lithium to the negative electrode in advance has been proposed.

Korean Patent Registration No. 1162794 discloses a method of manufacturing a negative electrode in which a lithium metal is deposited on a carrier substrate by a vapor deposition method and then the deposited lithium metal is stored in a negative electrode active material layer. However, this method has a disadvantage in that the manufacturing process is complicated.

Therefore, a lithium metal thin film which is difficult to handle can be uniformly bonded to a negative electrode, the pre-lithiation rate can be improved, and there is a need for development of a simple and easy process.

Technical Problem

It is an object of the present invention to provide a method of manufacturing a negative electrode which allows lithium metal to be uniformly laminated on a negative electrode material mixture by preventing lithium metal to be come off together with a release film when removing the release film after laminating lithium metal on the release film on the secondary battery negative electrode material mixture.

It is another object of the present invention to provide a method of manufacturing a negative electrode that improves the pre-lithiation rate of the negative electrode.

Technical Solution

In order to solve the above problems, the present invention provides a method of manufacturing a negative electrode for a secondary battery, including: a first step of preparing a lithium metal sheet formed by a release film coated with a lithium metal or to which the lithium metal is adhered in a form of a thin film and wound into a roll; a second step of laminating the lithium metal sheet to allow the lithium metal to be adjacent to a negative electrode material mixture, to thereby manufacture a negative electrode in which lithium metal is laminated; and third step of applying a pressure to the negative electrode having the lithium metal laminated thereon to manufacture a negative electrode, in which the release film is coated with silicon.

Also, the present invention provides a negative electrode manufactured by any one of the above methods, and a secondary battery including the negative electrode.

According to an embodiment of the present invention, the lithium metal may have a stripe, mesh, wave, or circular pattern.

According to one embodiment of the present invention, the lithium metal having a stripe pattern can be produced by cutting lithium metal as a base material into thin-width metals.

According to an embodiment of the present invention, the thickness of the lithium metal may be 2 to 200 μm.

According to an embodiment of the present invention, a method of applying pressure to a negative electrode in which lithium metal is stacked may be performed by passing the negative electrode through a pair of rollers or plates.

According to an embodiment of the present invention, a temperature when passing through the roller or the plate may be 5 to 100° C.

According to an embodiment of the present invention, the pressure when passing through the roller or the plate may be 10 to 100 kg/cm$^2$.

According to an embodiment of the present invention, a thickness of the release film may be 5 to 50 μm.

According to an embodiment of the present invention, the negative electrode material mixture may be prepared by applying a negative electrode slurry containing silicon oxide on a current collector, followed by drying and rolling.

Further, the present invention provides a method of manufacturing a secondary battery, including: manufacturing an electrode assembly by interposing a separator between a negative electrode and a positive electrode which negative electrode is manufactured by the above method; injecting an electrolyte into the electrode assembly; and aging, in which an initial charging is started by injecting the electrolyte.

According to one example of the present invention, the aging may be performed for 12 to 72 hours.

Further, the present invention provides a secondary battery having a feature that an initial charging is started by injecting an electrolyte into an electrode assembly including a negative electrode for a secondary battery manufactured by the above method.

Advantageous Effects

The manufacturing method of the present invention has the effect of uniformly stacking or bonding lithium metal, which is difficult to handle, on the negative electrode material mixture of the secondary battery.

The present invention also has the advantage of improving the pre-lithiation rate by using a patterned lithium metal.

The negative electrode prepared by the method of the present invention has improved initial irreversibility, and the secondary battery manufactured using such a negative electrode for the secondary battery has excellent charge/discharge efficiency.

DETAILED DESCRIPTION OF THE PREFERRED EMBODIMENTS

Hereinafter, the present invention will be described in detail. The present invention is not limited by the following examples and experimental examples. The embodiments according to the present invention may be modified into various other forms, and the scope of the present invention should not be construed as being limited to the embodiments described below. The embodiments of the present invention are provided to more fully describe the present invention to those skilled in the art.

Figure 1:
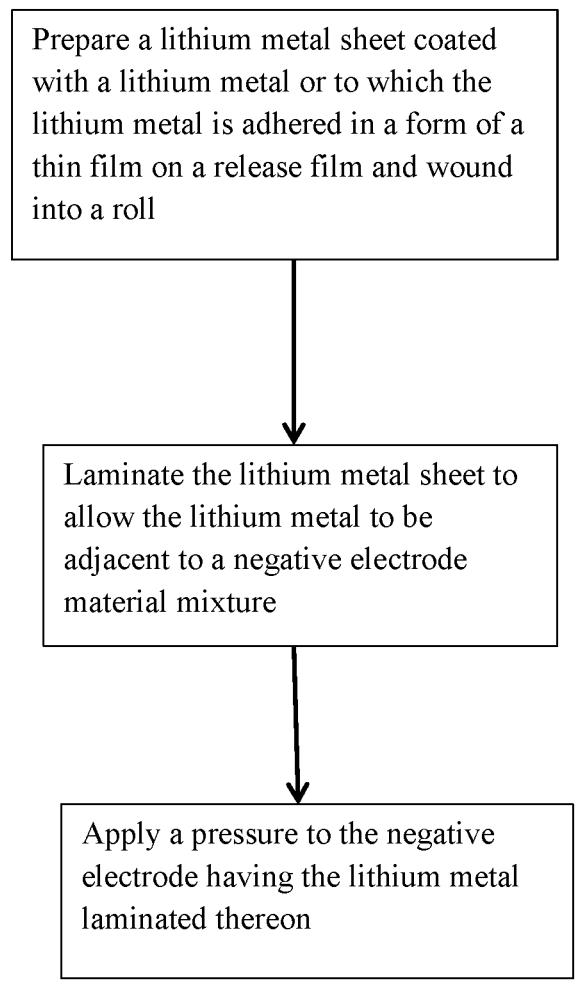
FIG. 1 is a flow chart of an embodiment of a method of the invention.

A negative electrode for a secondary battery according to the present invention is manufactured by: a first step of preparing a lithium metal sheet formed by a release film coated with a lithium metal or to which the lithium metal is adhered in a form of a thin film and wound into a roll; a second step of laminating the lithium metal sheet to allow the lithium metal to be adjacent to a negative electrode material mixture, to thereby manufacture a negative electrode in which lithium metal is laminated; and a third step of applying a pressure to the negative electrode having the lithium metal laminated thereon to manufacture a negative electrode, in which the release film is coated with silicon. These steps are depicted in the flowchart of FIG. 1.

The silicon oxide negative electrode is a negative electrode which uses silicon and oxides thereof as main materials in order to increase the capacity density of the negative electrode which uses the existing carbon material such as graphite. It has a theoretical capacity density of 4200 mAh/g, which is much higher than the theoretical capacity density of carbon material of 372 mAh/g, which can be suitably used as a negative electrode for a secondary battery. However, since the silicon oxide negative electrode is inferior in the stability of the form, the initial irreversible capacity is large, and there is a risk that the electrode capacity is reduced or the cell balance is collapsed, and thus a pre-lithiation process is required.

Figure 2A:
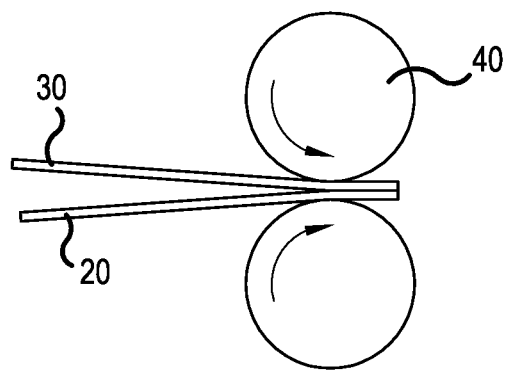
FIG. 2A depicts applying pressure to a lithium sheet and negative electrode with rollers.
Figure 2B:
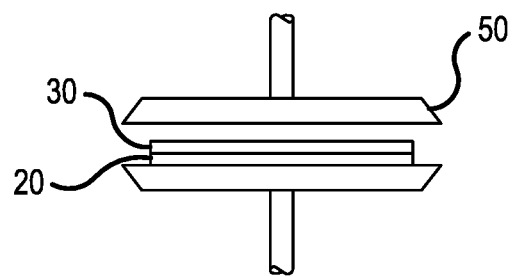
FIG. 2B depicts applying pressure to a lithium sheet and negative electrode with plates.

Pre-lithiation can be accomplished by passing lithium metal through the upper and lower rollers or plates together with the negative electrode, or by wetting the negative electrode and lithium metal together in the electrolyte to thereby allow lithium to be deposited into the negative electrode. However, lithium metal is inherently ductile in nature of its material and is not easy to handle because of its nature of sticking to different materials. The use of rollers to apply pressure to the lithium metal is depicted in FIG. 2A and the use of plates to apply pressure to the lithium metal is depicted in FIG. 2B. For ease of handling, a lithium metal sheet 30 formed by a lithium metal on a substrate such as a release or release film can be used. After the lithium metal sheet 30 is bonded to a negative electrode material mixture of a negative electrode 20, a portion of the lithium metal is released with the substrate during the removal of the substrate. Since this becomes a factor that attenuates the efficiency of pre-lithiation due to the non-uniformity of the negative electrode, the inventors of the present invention have studied the method in which lithium metal does not come off with the substrate when the substrate is removed, leading to the present invention.

According to the present invention, a lithium metal has been coated on a silicon-coated substrate, and a roll-up metal sheet has been used to facilitating the handling of the lithium metal. Further, when the substrate is peeled off, lithium metal does not come out of the substrate, and thus lithium metal can be uniformly bonded to the negative electrode 20.

Further, the present invention is characterized in that, in order to improve the pre-lithiation efficiency, a patterned lithium metal is applied so that the electrolyte can penetrate the negative electrode 20 more easily, thereby improving the speed of the pre-lithiation. This is because, if there is a pattern in the lithium metal bonded to the negative electrode 20, the speed of pre-lithiation is improved because the movement of lithium ions becomes faster.

At this time, the shape of the pattern may be in the form of a stripe, a mesh, a wave, a circle, or a lattice structure. The method of forming the pattern on the lithium metal is not particularly limited, and a known method can be used. Specifically, a lithium metal sheet 30 having a stripe pattern can be obtained by laminating a lithium metal thin film serving as a base material on a release film and then cutting the lithium metal to a thin width. The lithium metal sheet 30 of the mesh pattern may be obtained by laminating a lithium metal thin film serving as a base material on a release film, and then using a tool having a mesh pattern such as a punching machine. It is also possible to form the pattern using rollers 40 having the form of stripes, meshes, waves, circles and lattices.

As the releasing film or releasing paper, a material chemically stable with respect to lithium metal is preferable. Specific examples thereof include polymer films such as polyolefins including polyethylene and polypropylene, polyethylene terephthalate, polyimide and polyamide, and polyethylene terephthalate is preferable in terms of releasability.

In the present invention, the thickness of the lithium metal applied to the negative electrode 20 is preferably 2 to 200 μm, more preferably 3 to 40 μm, and most preferably 5 to 20 μm.

When the thickness of the lithium metal is less than 2 μm, it is not preferable from the viewpoint of pre-lithiation, and when the thickness of the lithium metal is more than 200 μm, there is a risk of short circuit.

In the present invention, the lithium metal sheet 30 refers to a lithium metal coated or adhered onto a release film. At this time, the thickness of the release film is 5 to 50 μm, more preferably 10 to 40 μm, and most preferably 15 to 30 μm. If the thickness of the release film is too thin, it is difficult to peel off the release film. If the thickness of the release film is too large, lithium metal may be desorbed together with peeling off the release film.

A negative electrode coated with a lithium metal can be produced by placing a rolled lithium metal sheet 30 on a negative electrode mixture layer and passing a negative electrode 20 having a lithium metal layer thereon through a pair of rollers 40 or plates 50.

At this time, the temperature at the time of passing through the roller or the plate is preferably 5 to 100° C. more preferably 15 to 30° C., and most preferably 20 to 25° C. If the temperature is too low, a part of the lithium metal may be desorbed from the negative electrode 20, and if the temperature is too high, the handling of the lithium metal may be deteriorated.

The pressure applied when passing the negative electrode 20 having the lithium metal sheet 30 laminated on the roller 40 or the plate 50 is 10 to 100 kg/cm$^2$, preferably 20 to 100 kg/cm$^2$, and most preferably 30 to 100 kg/cm$^2$. If the applied pressure is too low, it is difficult to achieve the object of the present invention, and if it is too high, the electrode may break.

The secondary battery according to the present invention includes an electrode assembly in which two electrodes of different polarities are stacked in a state separated from each other by a separator. The electrode assembly includes a positive electrode including a positive electrode active material, a negative electrode including a negative electrode active material, and a separator.

Specifically, the positive electrode, for example, may be prepared by applying a mixture of a positive electrode active material, a conductive material and a binder on a positive electrode current collector, followed by drying. If necessary, a filler may be further added to the mixture.

The positive electrode active material according to the present invention may be mixed with a compound, which uses a lithium intercalation material as its main component, such as a layered compound such as lithium cobalt oxide ($LiCoO_2$), lithium nickel oxide ($LiNiO_2$), or a compound substituted with one or more transition metals; lithium manganese oxides such as $Li_{1+x}Mn_{2-x}O_4$ (herein, x is between 0 and 33), $LiMnO_3$, $LiMn_2O_3$, and $LiMnO_2$; lithium copper oxide ($Li_2CuO_2$); vanadium oxides such as $LiV_3O_8$, $LiFe_3O_4$, $V_2O_5$, and $Cu_2V_2O_7$; lithium nickel oxide expressed by $LiNi_{1-x}MxO_2$ (herein, M=Co, Mn, Al, Cu, Fe, Mg, B or Ga, and x=0.01 to 0.3); lithium manganese composite oxide expressed by $LiMn_{2-x}M_xO_2$ (herein, M=Co, Ni, Fe, Cr, Zn or Ta, x=0.01 to 0.1) or $Li_2Mn_3MO_8$ (herein, M=Fe, Co, Ni, Cu or Zn); $LiMn_2O_4$ in which a part of Li in the formula is substituted with an alkaline earth metal ion; disulfide compound; and $Fe_2(MoO_4)_3$ or a compound oxide formed by combination thereof.

The positive electrode collector generally has a thickness of 3 to 500 micrometers. The positive electrode current collector is not particularly limited as long as it has high conductivity without causing a chemical change in the battery. Examples of the positive electrode current collector include stainless steel, aluminum, nickel, titanium, sintered carbon or aluminum or stainless steel of which the surface has been treated with carbon, nickel, titanium, silver, or the like. The current collector may have fine irregularities on the surface thereof to increase the adhesion of the positive electrode active material, and various forms such as a film, a sheet, a foil, a net, a porous body, a foam, and a nonwoven fabric are possible.

The conductive material is usually added in an amount of 1 to 50% by weight based on the total weight of the mixture including the positive electrode active material. Such a conductive material is not particularly limited as long as it has electrical conductivity without causing a chemical change in the battery, and examples thereof include graphite such as natural graphite and artificial graphite; carbon black such as carbon black, acetylene black, Ketjen black, channel black, furnace black, lamp black, and summer black; conductive fibers such as carbon fiber and metal fiber; metal powders such as carbon fluoride, aluminum and nickel powder; conductive whiskey such as zinc oxide and potassium titanate; conductive oxides such as titanium oxide; and conductive materials such as polyphenylene derivatives and the like.

The binder is added in an amount of 1 to 50% by weight, on the basis of the total weight of the mixture containing the positive electrode active material, as a component that assists in bonding between the active material and the conductive material and bonding to the current collector. Examples of such binders include polyvinylidene fluoride, polyvinyl alcohol, carboxymethylcellulose (CMC), starch, hydroxypropylcellulose, regenerated cellulose, polyvinylpyrrolidone, tetrafluoroethylene, polyethylene, polypropylene, ethylene-propylene-diene terpolymer (EPDM), sulfonated EPDM, styrene butylene rubber, fluorine rubber, various copolymers and the like.

The filler is optionally used as a component for inhibiting expansion of a positive electrode, and is not particularly limited as long as it is a fibrous material without causing a chemical change in the battery. Examples of the filler include olefin polymers such as polyethylene and polypropylene; fibrous materials such as glass fibers and carbon fibers.

Further, the negative electrode may be formed by coating a negative electrode material on a negative electrode collector and drying the negative electrode active material. The negative electrode may further include the above-described components.

The negative electrode current collector is generally made to a thickness of 3 to 500 micrometers. The negative electrode current collector is not particularly limited as long as it has electrical conductivity without causing chemical changes in the battery, and examples thereof include copper, stainless steel, aluminum, nickel, titanium, sintered carbon, copper or stainless steel of which the surface has been treated with carbon, nickel, titanium, silver or the like, aluminum-cadmium alloy, or the like. In addition, like the positive electrode current collector, fine unevenness can be formed on the surface to enhance the bonding force of the negative electrode active material, and it can be used in various forms such as a film, a sheet, a foil, a net, a porous body, a foam, and a nonwoven fabric.

As the negative electrode active material of the present invention, a material capable of reversibly adsorbing/discharging lithium ions such as silicon (Si) and tin may be used. Particularly, in the case of silicon (Si) based active material, the volume change and the surface side reaction are so severe that a large amount of lithium inserted into the negative electrode does not return to the positive electrode at the time of initial charging, and thus, there arises a problem that the initial irreversible capacity increases, and therefore, the effect of the present invention is further maximized by carrying out pre-lithiation.

As long as such a material is used, it is possible to exhibit the effects of the present invention in any of composite, alloy, compound, solid solution and composite negative electrode active material including silicon-containing material and tin-containing material. As the silicon-containing material, Si, $SiO_x$ ($0<x<4$) or an alloy, a compound or a solid solution which is generated by substituting part of Si or Si contained in $SiO_x$ with at least one element selected from the group consisting of B, Mg, Ni, Ti, Mo, Co, Ca, Cr, Cu, Fe, Mn, Nb, Ta, V, W, Zn, C, N, and Sn may be used.

These materials may constitute a negative electrode active material alone or may constitute a negative electrode active material by a plurality of kinds of materials. Examples of constituting the negative electrode active material by the plural kinds of materials include a compound containing Si, oxygen and nitrogen, a composite of a plurality of compounds containing Si and oxygen and having different composition ratios of Si and oxygen, and the like.

It is possible to use a commonly known polyolefin separator or a composite separator in which an organic and inorganic composite layer is formed on the olefin based material, as a separator for insulating the electrodes between the positive electrode and the negative electrode, and the present invention is not limited to these examples.

The electrolyte injected into the secondary battery is a lithium salt-containing non-aqueous electrolyte, which is composed of a nonaqueous electrolyte and lithium. As the non-aqueous electrolyte, a non-aqueous electrolyte, a solid electrolyte, an inorganic solid electrolyte and the like are used.

Examples of the non-aqueous electrolyte include N-methyl-2-pyrrolidinone, propylene carbonate, ethylene carbonate, butylenecarbonate, dimethyl carbonate, diethyl carbonate, gamma-Butyrolactone, 1,2-dimethoxyethane, tetrahydroxyfuran, 2-methyltetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxymethane, dioxolane derivatives, sulfolane, methyl sulfolane, 1,3-dimethyl-2-imidazolidinone, propylene carbonate derivatives, tetrahydrofuran derivatives, ethers, methyl pyrophosphate, ethyl propionate, etc.

Examples of the organic solid electrolyte include a polymer electrolyte such as a polyethylene derivative, a polyethylene oxide derivative, a polypropylene oxide derivative, a phosphate ester polymer, an agitation lysine, a polyester sulfide, a polyvinyl alcohol, a polyvinylidene fluoride, a polymer including an ionic dissociation group, and the like.

Examples of the inorganic solid electrolyte include nitrides, halides, and sulfates of Li such as $Li_3N$, $LiI$, $Li_5NI_2$, $Li_3N-LiI-LiOH$, $LiSiO_4$, $LiSiO_4-LiI-LiOH$, $Li_2SiS_3$, $Li_4SiO_4$, $Li_4SiO_4-LiI-LiOH$, and $Li_3PO_4-Li_2S-SiS_2$.

The lithium salt is a substance that is soluble in the non-aqueous electrolyte. The examples of the lithium salt include $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, lower aliphatic carboxylic acid lithium, lithium 4-phenylborate, imide and the like.

For the purpose of improving charge/discharge characteristics, flame retardancy, etc., pyridine, triethylphosphite, triethanolamine, cyclic ether, ethylenediamine, n-glyme, hexaphosphoric triamide, nitrobenzene derivative, sulfur, quinone imine dye, N-substituted oxazolidinone, N-substituted imidazolidine, ethylene glycol dialkyl ether, ammonium salt, pyrrole, 2-methoxyethanol, aluminum trichloride, etc. may be added to the non-aqueous electrolyte. In some cases, a halogen-containing solvent such as carbon tetrachloride or ethylene trifluoride may be further added to impart nonflammability, or a carbon dioxide gas may be further added to improve high temperature storage characteristics.

Further, the present invention provides a method of manufacturing a secondary battery, including: manufacturing an electrode assembly by interposing a separator between a negative electrode and a positive electrode which are manufactured by the above method; injecting an electrolyte into the electrode assembly; and aging, in which an initial charging is started by injecting the electrolyte. At this time, aging is preferably performed for 12 to 72 hours, more preferably for 24 to 48 hours.

Since the negative electrode for a secondary battery of the present invention has a patterned lithium metal interposed therebetween, the electrolyte has a better penetration into a negative electrode, thereby increasing the moving speed of lithium ions. Accordingly, the secondary battery including the negative electrode for a secondary battery of the present invention is characterized in that charging is started as lithium ions are stored in a negative electrode as soon as the electrolyte is injected into the secondary battery even if artificial initial charging is not performed after the electrode assembly is manufactured.

Hereinafter, the present invention will be described in more detail through examples below. However, the following Examples and Experimental Examples are provided for illustrating the present invention, and the scope of the present invention is not limited by these Examples and Experimental Examples.

Example 1

<Preparation of Negative Electrode Mixture>

As a negative electrode active material, 92 wt % of SiO, 3 wt % of Denka Black (conductive material), 3.5 wt % of SBR (binder) and 1.5 wt % of CMC (thickener) were added to water as the negative electrode active material, to thereby prepare a negative electrode mixture slurry.

The negative electrode mixture slurry was coated on one side of the copper collector, dried and rolled, and then punched to a predetermined size to produce a negative electrode mixture.

<Preparation of Negative Electrode Coated with Lithium Metal>

A lithium metal sheet 30 laminated with a lithium metal having a thickness of 10 μm on a silicon-coated PET (polyethylene terephthalate) substrate having a thickness of 20 μm and wound in a roll form was prepared. The negative electrode mixture thus prepared was laminated with a lithium metal sheet 30, and a negative electrode 20 coated with lithium metal was prepared by applying a pressure of 15 kg/cm² while passing through a pair of rollers 40 having a temperature of 25° C.

<Preparation of Positive Electrode Mixture>

A positive electrode mixture slurry was prepared by adding 96% by weight of $LiNiCoMnO_2$, 2% by weight of Denka black (conductive material) and 2% by weight of PVDF (polyvinylidene fluoride, binder), as the positive electrode active material, to NMP (N-Methyl-2-Pyrrolidone). The positive electrode mixture slurry prepared above was coated on one surface of the aluminum current collector to a thickness of 100 μm, dried and rolled, and punched to a predetermined size to prepare a positive electrode mixture.

<Preparation of Lithium Secondary Battery>

A coin cell having a polypropylene porous film interposed between the prepared positive electrode material mixture and the negative electrode material mixture was prepared. A lithium secondary battery was prepared by injecting an electrolyte in which 1 M hexafluorophosphate ($LiPF_6$) was dissolved in a solvent in which ethylene carbonate (EC) and ethyl methyl carbonate (DEC) were mixed in a volume ratio of 50:50.

Example 2

A secondary battery was produced under the same conditions as in Example 1 except that a lithium metal having a pattern formed in a mesh form was used. At this time, the size of the pattern is 0.1 μm*0.1 μm.

Example 3

A secondary battery was produced under the same conditions as in Example 2, except that the thickness of the lithium metal was changed to 20 μm.

Example 4

A secondary battery was manufactured under the same conditions as in Example 2, except that the pressure applied by the roller was changed to 30 kg/cm².

Comparative Example 1

A secondary battery was manufactured under the same conditions as in Example 1, except that a lithium metal laminate in which lithium metal was laminated on a non-silicon-coated PET substrate was bonded to a negative electrode mixture.

Comparative Example 2

A secondary battery was produced under the same conditions as in Example 1, except that the temperature of the roller was changed to 120° C.

Comparative Example 3

A secondary battery was produced under the same conditions as in Example 1, except that the pressure applied by the roller was changed to 120 kg/cm².

<Reversibility Test Through Charging and Discharging of the First Cycle>

Charging/discharging reversibility tests were carried out on the secondary batteries of the above-described Examples and Comparative Examples using an electrochemical charging/discharging device. During the first cycle, the battery was charged with a current density of 0.005 V (vs. $Li/Li^+$) at a current density of 0.1 C-rate and discharged to a voltage of 1.5 V (vs. $Li/Li^+$) at the same current density. The charging capacity and the discharging capacity were measured at this time, and the charging/discharging efficiency according to the following mathematical formula 1 was calculated and shown in Table 1.

$$\text{Charge/discharge efficiency (\%)} = \frac{\text{Discharge capacity}}{\text{charge capacity}} \times 100 \qquad \text{[Mathematical formula 1]}$$

TABLE 1

| | Charge/discharge efficiency |
|---|---|
| Example 1 | 94 |
| Example 2 | 95 |
| Example 3 | 98 |
| Example 4 | 95 |
| Comparative Example 1 | 94 |
| Comparative Example 2 | 94 |
| Comparative Example 3 | 94 |

As shown in Table 1, it was confirmed that Examples 2 to 4, in which a pattern was formed on the lithium metal, were excellent in charging/discharging efficiency as compared with Comparative Examples. This is attributed to the fact that, in the case of the batteries of the above-described embodiments, the patterning is formed on the lithium metal to improve the pre-lithiation speed.

While the present invention has been particularly shown and described with reference to exemplary embodiments thereof, it is to be understood that the present invention is not limited to the disclosed exemplary embodiments, and various changes and modifications may be made without departing from the technical idea of the present invention and the scope of the appended claims.

The invention claimed is:

1. A method of manufacturing a negative electrode for a secondary battery, the method comprising:

preparing a lithium metal sheet formed by a release film coated with a lithium metal or to which the lithium metal is adhered in a form of a thin film and wound into a roll;

forming a pattern in the lithium metal with a tool having the pattern; and laminating the patterned lithium metal sheet to allow the lithium metal to be adjacent to a negative electrode material mixture, to thereby manufacture a negative electrode in which lithium metal is laminated, wherein the laminating comprises applying a pressure to the negative electrode having the lithium metal thereon to manufacture the negative electrode, wherein the release film is coated with silicon, wherein the pattern in the lithium metal is a stripe, mesh, wave or circular pattern, and wherein forming the pattern in the lithium metal and the laminating occurs simultaneously.

2. The method of claim 1, wherein the lithium metal has a thickness of 2 to 200 μm.

3. The method of claim 1, wherein the applying of pressure to the negative electrode is performed by passing the negative electrode through a pair of rollers or plates.

4. The method of claim 3, wherein a temperature at the time of passing through the rollers or the plates is 5 to 100° C.

5. The method of claim 3, wherein the pressure at the time of passing through the roller or the plate is 10 to 100 kg/cm$^2$.

6. The method of claim 1, wherein a thickness of the release film is 5 to 50 μm.

7. The method of claim 1, wherein the negative electrode material mixture is prepared by applying a negative electrode slurry containing silicon oxide on a current collector and then drying and rolling the negative electrode material mixture.

8. A negative electrode for a secondary cell produced by the method according to claim 1.

9. A secondary battery having a feature that an initial charging is started by injecting an electrolyte into an electrode assembly including a negative electrode for a secondary battery manufactured by the method according to claim 1.

10. The method of claim 1, wherein the tool having the pattern is a roller.

* * * * *